April 14, 1964     F. F. HESS ETAL     3,128,556
DRAFTING APPARATUS FOR PRODUCING THREE-PLANE DRAWINGS
Filed Feb. 15, 1962     11 Sheets-Sheet 1

INVENTOR.
FRANK F. HESS
FRANCIS A. HESS
BY JOHN J. HESS

Donnelly, Mentag & Harrington
ATTORNEYS

April 14, 1964 F. F. HESS ETAL 3,128,556
DRAFTING APPARATUS FOR PRODUCING THREE-PLANE DRAWINGS
Filed Feb. 15, 1962 11 Sheets-Sheet 2

INVENTOR.
FRANK F HESS
BY FRANCIS A HESS
JOHN J HESS
Donnelly Mentag & Harrington
ATTORNEYS

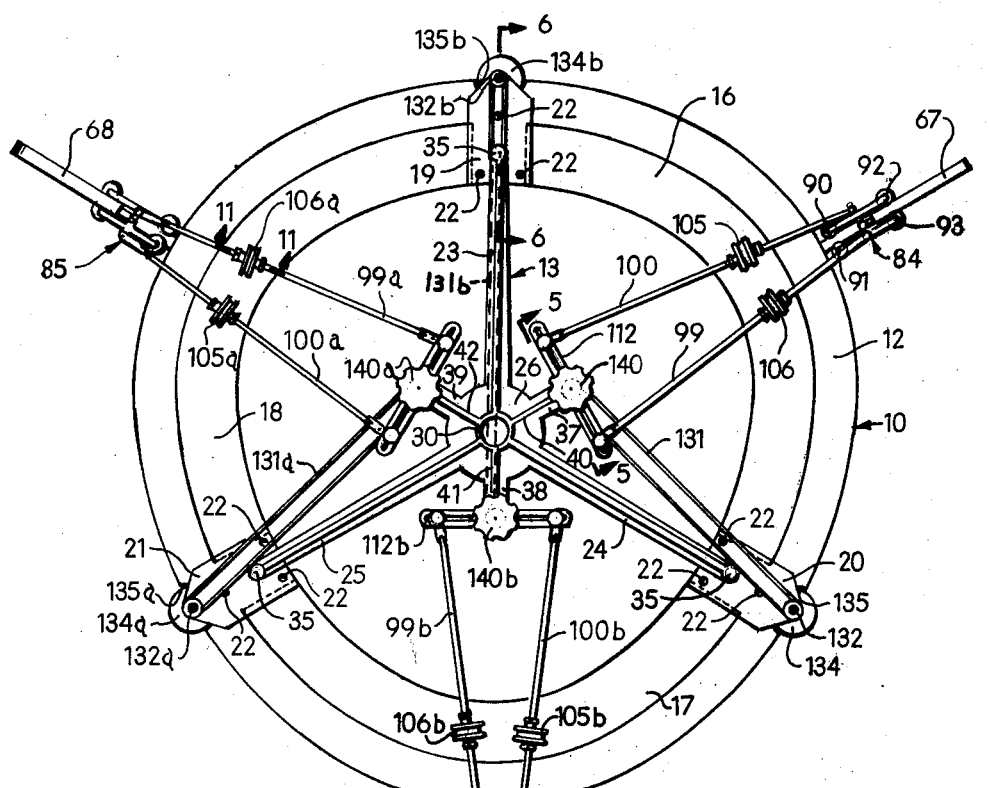

INVENTOR.
FRANK F. HESS
FRANCIS A. HESS
BY JOHN J. HESS

ATTORNEYS

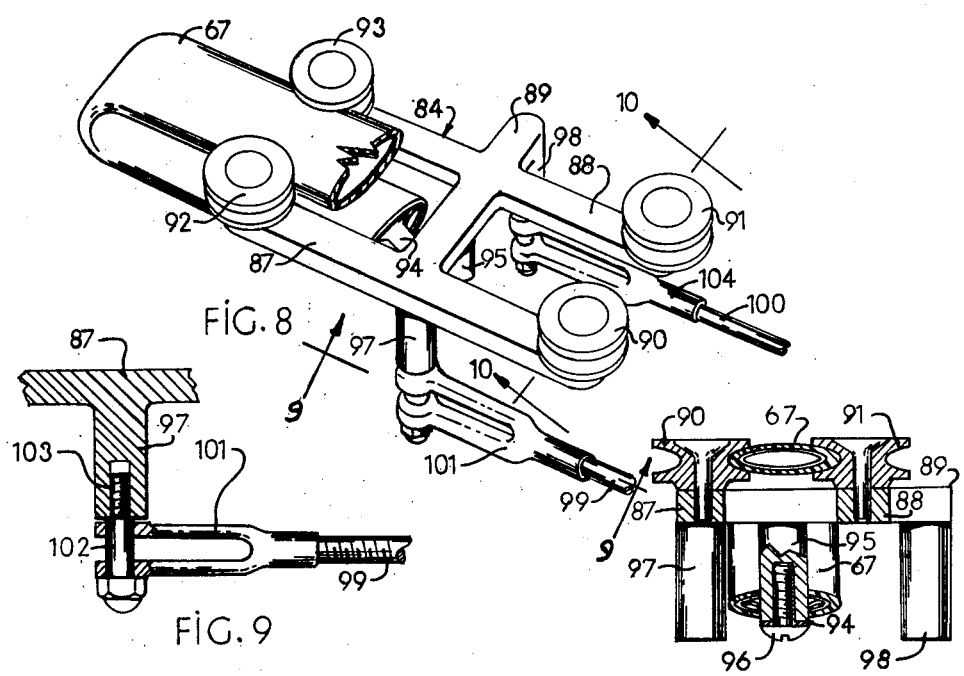
FIG. 8
FIG. 9
FIG. 10
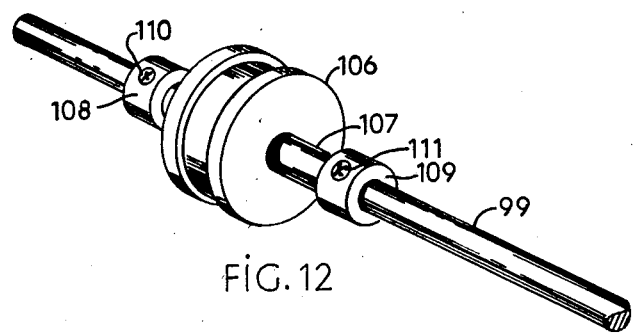
FIG. 12
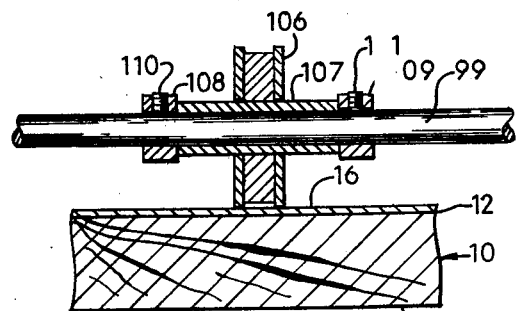
FIG. 11
INVENTOR.
FRANK F. HESS
FRANCIS A. HESS
BY  JOHN J. HESS
ATTORNEYS April 14, 1964    F. F. HESS ETAL    3,128,556
DRAFTING APPARATUS FOR PRODUCING THREE-PLANE DRAWINGS
Filed Feb. 15, 1962    11 Sheets-Sheet 6

INVENTOR.
FRANK F. HESS
FRANCIS A. HESS
BY JOHN J. HESS

ATTORNEYS

April 14, 1964    F. F. HESS ETAL    3,128,556
DRAFTING APPARATUS FOR PRODUCING THREE-PLANE DRAWINGS
Filed Feb. 15, 1962    11 Sheets-Sheet 7

INVENTOR.
FRANK F. HESS
FRANCIS A. HESS
BY JOHN J HESS

ATTORNEYS

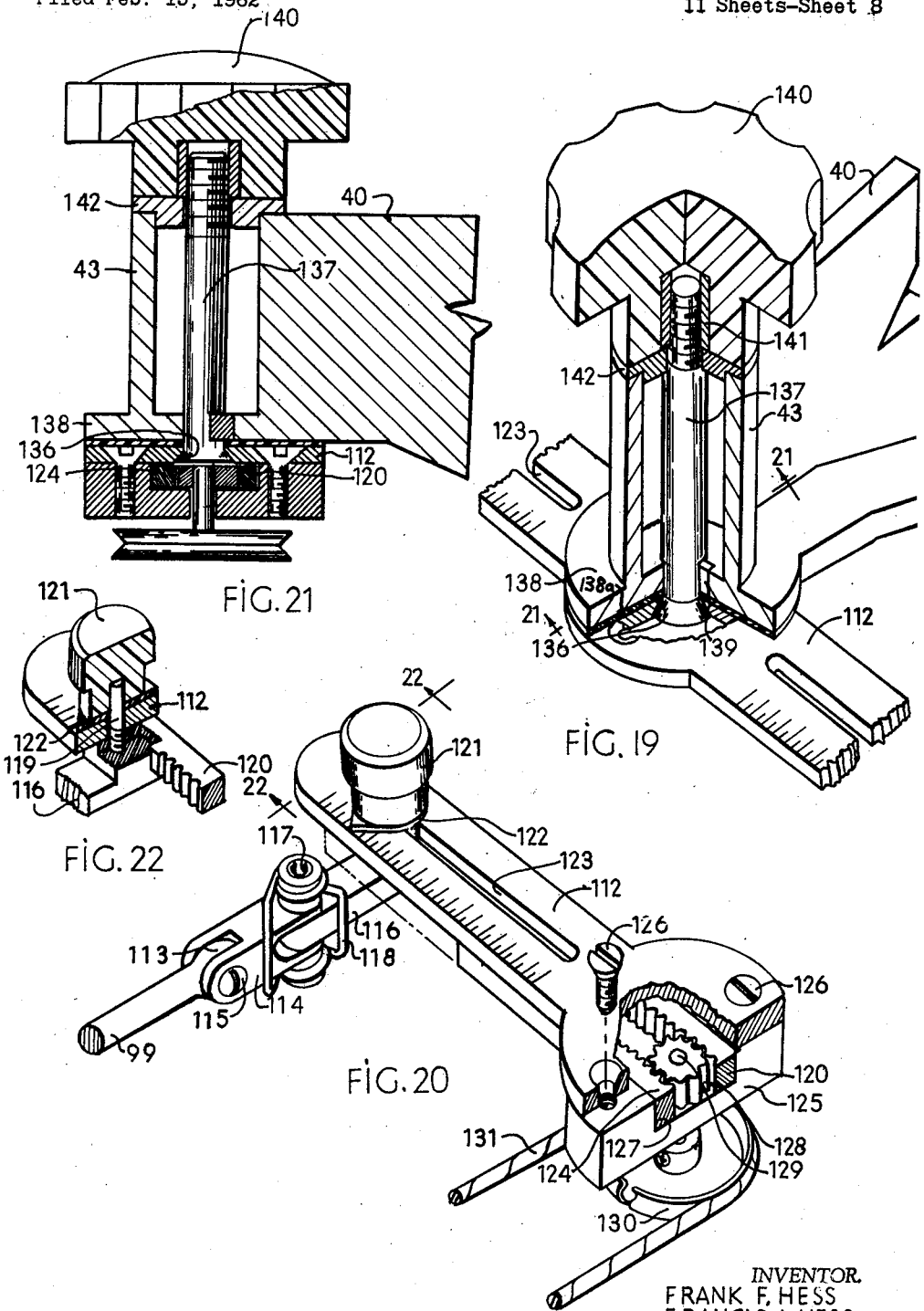

April 14, 1964   F. F. HESS ETAL   3,128,556
DRAFTING APPARATUS FOR PRODUCING THREE-PLANE DRAWINGS
Filed Feb. 15, 1962   11 Sheets-Sheet 9

INVENTOR.
FRANK F. HESS
FRANCIS A. HESS
BY   JOHN J. HESS

ATTORNEYS

April 14, 1964  F. F. HESS ETAL  3,128,556
DRAFTING APPARATUS FOR PRODUCING THREE-PLANE DRAWINGS
Filed Feb. 15, 1962  11 Sheets-Sheet 10
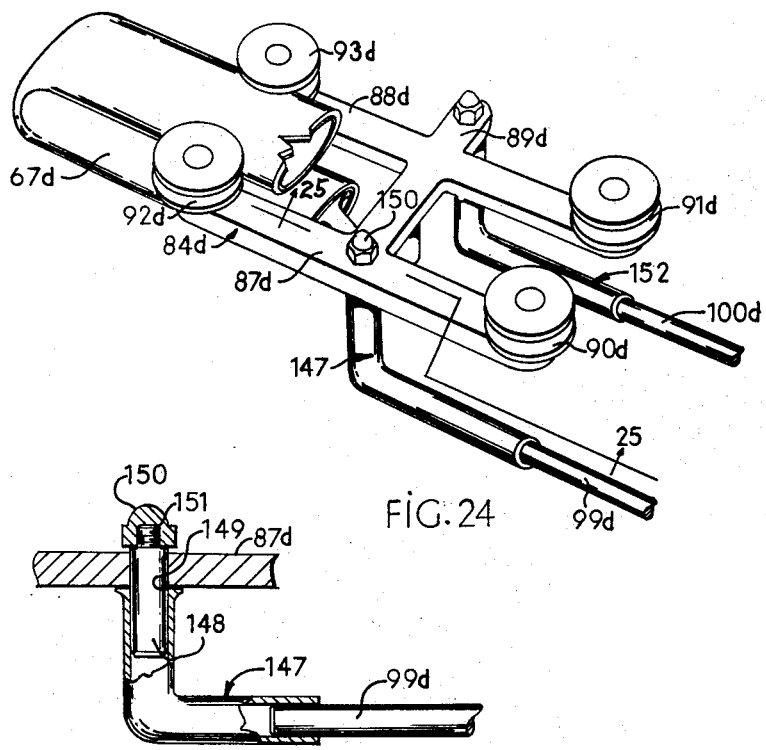
FIG. 24
FIG. 25
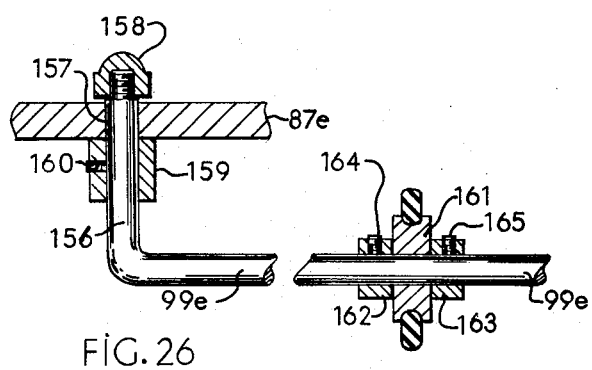
FIG. 26   FIG. 27
INVENTOR.
FRANK F. HESS
FRANCIS A. HESS
BY JOHN J. HESS
ATTORNEYS April 14, 1964 F. F. HESS ETAL 3,128,556
DRAFTING APPARATUS FOR PRODUCING THREE-PLANE DRAWINGS
Filed Feb. 15, 1962 11 Sheets-Sheet 11

INVENTOR.
FRANK F. HESS
FRANCIS A. HESS
BY JOHN J. HESS

Donnelly, Mentag & Harrington
ATTORNEYS

United States Patent Office 3,128,556
Patented Apr. 14, 1964

3,128,556
DRAFTING APPARATUS FOR PRODUCING
THREE-PLANE DRAWINGS
Frank F. Hess, 14170 Piedmont, Detroit 23, Mich.;
Francis A. Hess, 18780 San Jose, Lathrup Village,
Mich.; and John J. Hess, 8335 Centralia, Dearborn
Township, Wayne County, Mich.
Filed Feb. 15, 1962, Ser. No. 173,492
14 Claims. (Cl. 33—77)

This invention relates generally to an improved drafting apparatus, and more particularly to a drafting apparatus especially adapted for producing three-plane drawings, with or without diminishing or perspective effect, as isometric drawings, orthographic drawings, or the like.

The making of three-plane drawings is a tedious and time consuming operation. Heretofore, the time and cost of preparing three-plane drawings has made such drawings prohibitive in some instances. Attempts have been made in the past to overcome the disadvantages of making three-plane drawings by providing drawing devices for aiding the draftsman in preparing such drawings. However, such prior art devices have been costly and difficult to operate. Accordingly, it is an important object of the present invention to provide a mechanical drafting apparatus for making three-plane drawings which is adapted to overcome the aforementioned disadvantages of the prior art perspective drawing devices.

It is another object of the present invention to provide a mechanical drawing apparatus for making three-plane drawings which is economical of manufacture, simple and compact in construction, efficient in operation and easy to operate.

It is a further object of the present invention to provide a mechanical drafting apparatus adapted to produce three-plane drawings which includes an elliptical drawing board over which is operatively movable three flexible straight edges which are hinged together at a common point, whereby the desired parallel or diminishing effect for drawing purposes is automatically controlled, and, which drafting apparatus further includes directional and diminishing effect control mechanism for manually adjusting the three flexible straight edges to any desired position to produce the desired parallel or diminishing effect in a three-plane drawing.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 4 is a rear elevational view, slightly enlarged, of the structure illustrated in FIG. 1, with the support stand removed;

FIG. 5 is an enlarged, fragmentary, horizontal view of the structure illustrated in FIG. 4, taken along the line 5—5 thereof and looking in the direction of the arrows;

FIG. 8 is an enlarged fragmentary perspective view of the structure of FIG. 1, taken within the circle marked "8," and with parts removed;

FIG. 9 is a fragmentary, enlarged, elevational sectional view of the structure illustrated in FIG. 8, taken along the line 9—9 thereof, and looking in the direction of the arrows;

FIG. 10 is a slightly enlarged, fragmentary, elevational sectional view of the structure illustrated in FIG. 8, taken along the line 10—10 thereof, looking in the direction of the arrows, and with parts removed;

FIG. 11 is a fragmentary, enlarged, elevational sectional view of the structure illustrated in FIG. 4, taken along the line 11—11 thereof, and looking in the direction of the arrows;

FIG. 12 is a perspective view of the magnetic roller illustrated in FIG. 11, and with parts removed;

FIG. 19 is an enlarged perspective view, partly in section, of one of the directional control lock knobs employed in the invention;

FIG. 20 is a fragmentary perspective view of a portion of the diminishing control arm structure employed with the directional control lock knob of FIG. 19;

FIG. 21 is an elevational view, partly in section, of the structure illustrated in FIG. 19, taken along the line 21—21 thereof and looking in the direction of the arrows;

FIG. 22 is a fragmentary elevational sectional view of the structure illustrated in FIG. 20, taken along the line 22—22 thereof and looking in the direction of the arrows;

FIG. 24 is a fragmentary enlarged perspective view of the structure illustrated in FIG. 23, taken within the circle marked "24," and with parts broken away;

FIG. 25 is an enlarged, fragmentary, elevational view, partly in section, of the structure illustrated in FIG. 24, taken substantially along the line 25—25 thereof and looking in the direction of the arrows;

FIG. 26 is a view similar to FIG. 25 and showing a slightly modified control rod structure;

FIG. 27 is a fragmentary, enlarged, elevational sectional view of the modified rubber roller structure illustrated in FIG. 23, taken along the line 27—27 thereof and looking in the direction of the arrows;

Figures 1, 2:
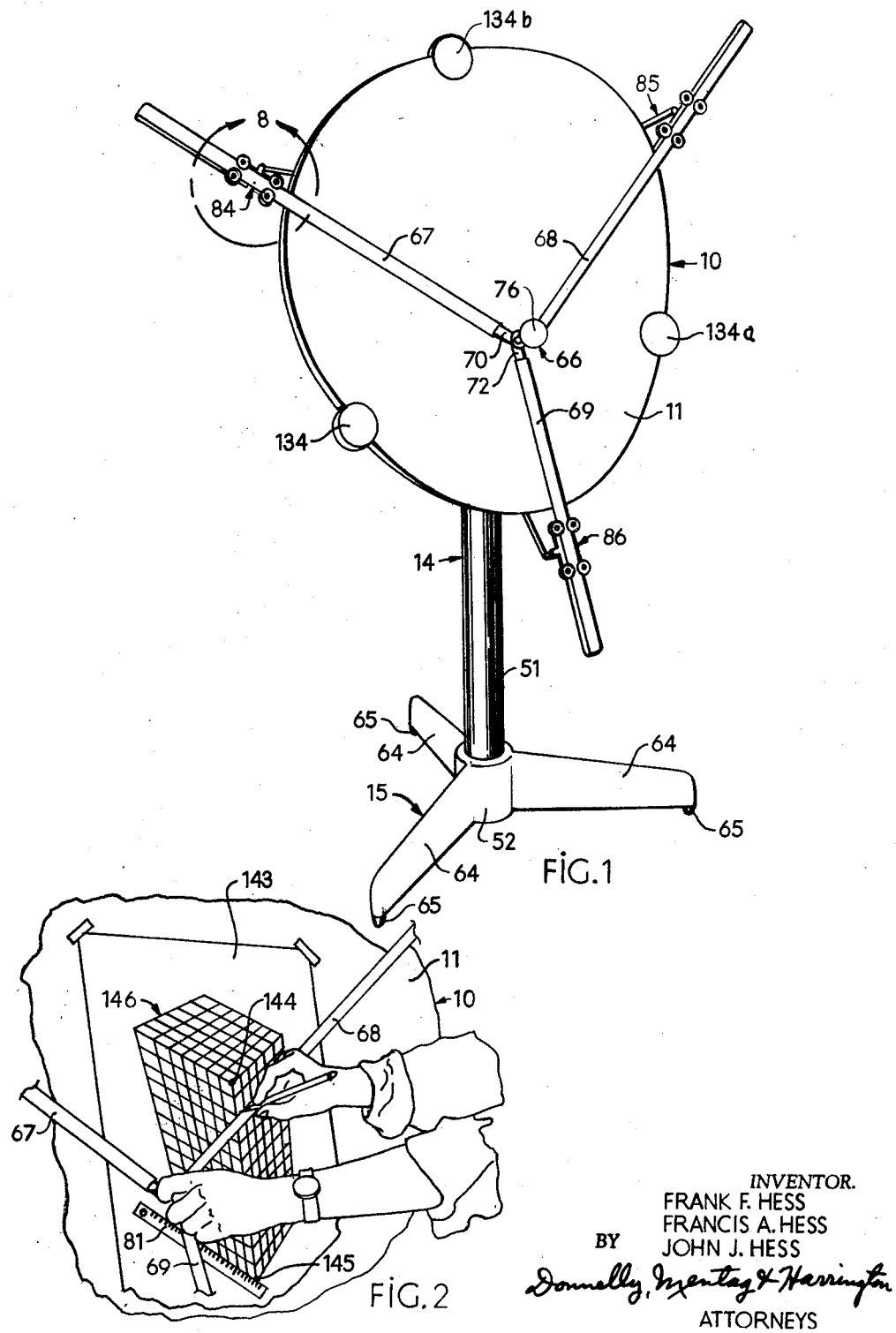
FIG. 1 is a front perspective view of the drafting apparatus for making a three-plane drawing.
FIG. 2 is a fragmentary elevational view of the front surface of the drawing board illustrated in FIG. 1, and showing an example of a three-plane drawing being made by the apparatus of FIG. 1.
Figure 6:
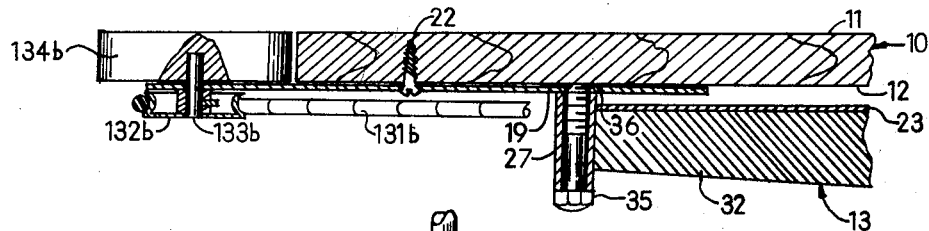
FIG. 6 is a fragmentary, enlarged, elevational sectional view of the structure illustrated in FIG. 4, taken along the line 6—6 thereof, and looking in the direction of the arrows.
Figure 7:
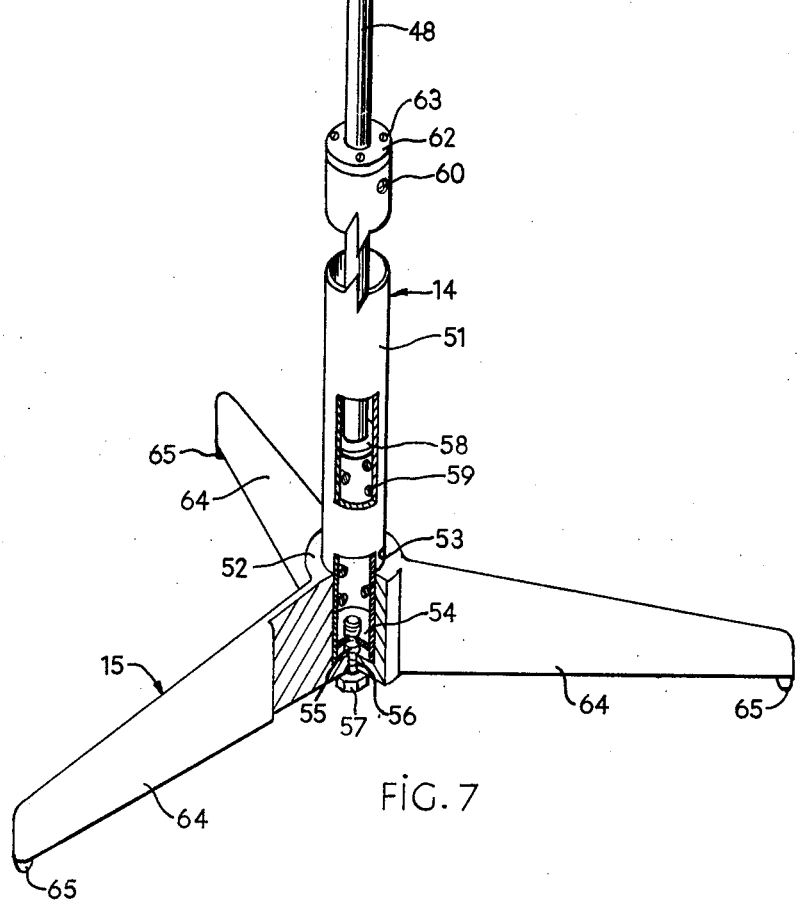
FIG. 7 is a slightly enlarged perspective view of the supporting base structure illustrated in FIG. 1, with parts removed, and with parts in section.

Referring now to the drawings, and in particular to FIGS. 1, 4 and 6, the reference numeral 10 generally designates an elliptical drawing board having a front surface 11 and a parallel rear surface 12. The drawing board 10 is operatively mounted on a support frame 13 (FIGS. 3 and 4) which is adjustably carried on the upright support or standard generally indicated by the numeral 14. As best seen in FIG. 7, the upright support 14 is fixedly mounted on a support base generally indicated by the numeral 15.

As shown in FIGS. 4, 6 and 11, the drawing apparatus of the present invention is provided with three arcuately shaped magnetic roller support plates 16, 17 and 18 which are made from any suitable material, as 1/32 inch thick steel plate. The magnetic roller support plates 16, 17 and 18 are disposed on the rear surface 12 of the drawing board 10 at a position spaced inwardly from the periphery of the drawing board, and they are fixedly secured in place by any suitable means, as by being bonded in place and by means of the radially disposed elongated retainer plates 19, 20 and 21. The retainer plates 19, 20 and 21 are secured over the ends of two adjacent magnetic roller support plates, by any suitable means, as by means of approximately nine of the wood screws 22.

Figure 3:
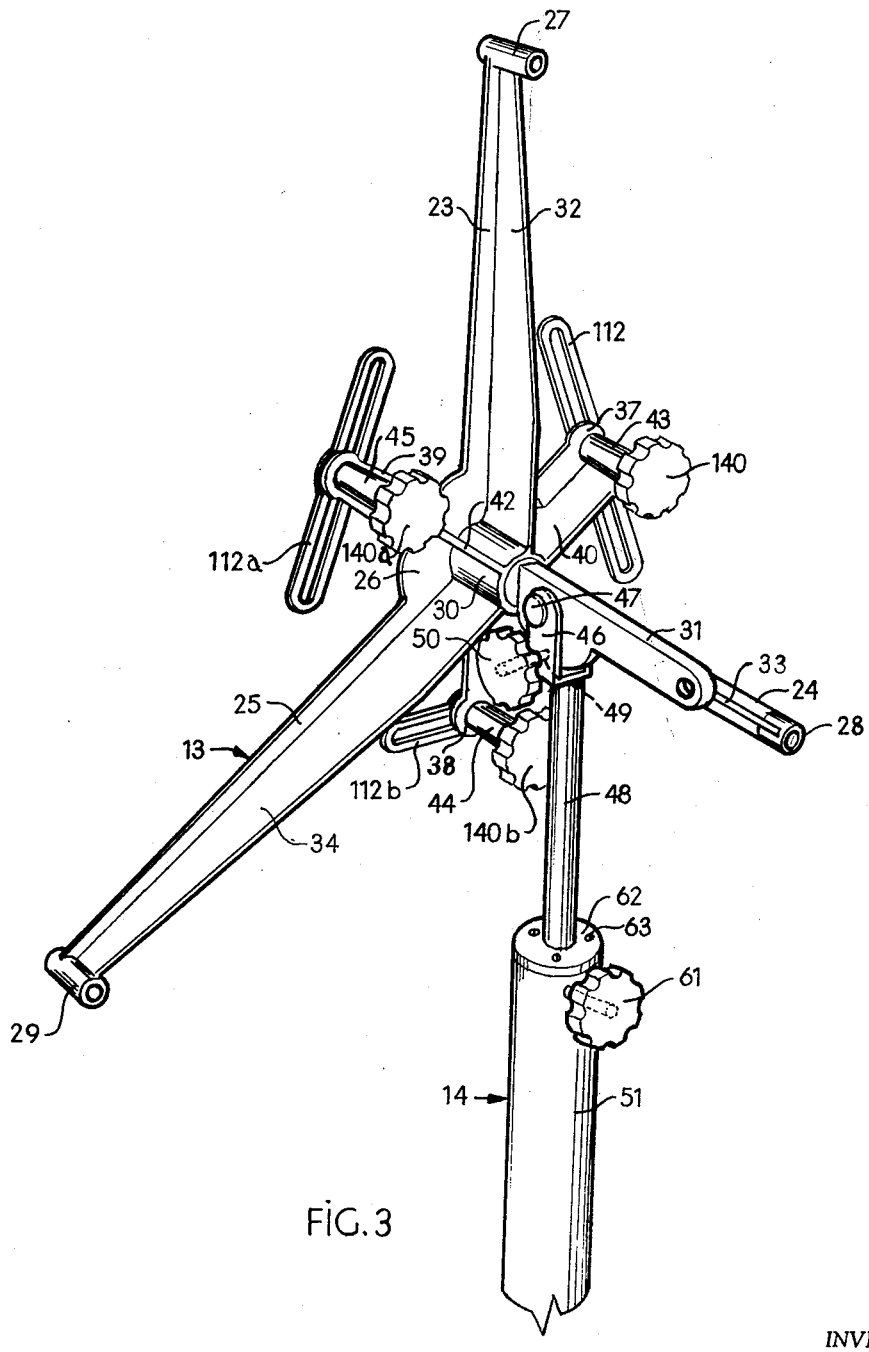
FIG. 3 is a rear perspective view of the drawing board support frame employed in the apparatus of FIG. 1.

The support frame 13 (FIG. 3) comprises the three primary or main support arms, indicated by the numerals 23, 24 and 25, which extend radially outwardly from the primary or round central plate or disc 26. The support frame main support arms are angularly spaced apart approximately 120° from each other. Fixedly connected to the outer ends of the support arms 23, 24 and 25 are the mounting sleeves 27, 28 and 29, respectively. As best seen in FIG. 3, the support frame 13 further includes the central mounting pivot or sleeve member 30 which is fixedly mounted on the rear face of the central disc or plate 26, and in which is fixedly mounted the round front end of the pivot arm 31 by means of a bolt (not shown) passing through the plate 26 from the front side thereof. The main support arms 23, 24 and 25 are each provided with a brace or stiffening plate as 32, 33 and 34, respectively, and these stiffening plates are disposed perpendicular to said arms and extend rearwardly therefrom. The stiffening plates 32, 33 and 34 are fixedly connected to the support arms 23, 24 and 25 and to the central mounting pivot 30, and to the respective mounting sleeves 27, 28 and 29, by any suitable means as by welding. It will be obvious that the aforedescribed support frame structure could be die cast as an integral unit, if desired.

As shown in FIGS. 4 and 6, the support frame 13 is fixedly secured to the rear surface 12 of the drawing board 10 by means of three bolts 35, which are adapted to pass through the mounting sleeves 27, 28 and 29 and be threadably engaged with a suitable threaded nut means as 36 which is formed in the plates 19, 20 and 21. As shown in FIGS. 3 and 4, the support frame 13 further includes three secondary support arms indicated by the numerals 37, 38 and 39, and these arms extend radially outwardly from the central disc 26 and at angular positions which are spaced apart 120 degrees from each other. The secondary support arms 37, 38 and 39 are short arms and extend outwardly from the disc 26 a very short distance, and these arms are angularly disposed midway between the two adjacent main support arms, approximately 60° from each adjacent main support arm. The secondary support arms 37, 38 and 39 are each provided with the fixedly mounted rearwardly extended brace plates 40, 41 and 42, respectively, which are fixedly connected thereto. The brace plates 40, 41 and 42 are fixedly connected at their inner ends to the central mounting pivot 30 and at the outer ends thereof are fixedly connected to the sleeves or tubular members 43, 44 and 45, respectively. Operatively mounted on each of the secondary support arms 37, 38 and 39 are directional and diminishing control adjustment and locking means which will be described in detail hereinafter. The aforedescribed secondary support arm structure may also be die cast as a unitary structure with the main support arms, if desired.

As shown in FIG. 3, the support pivot arm 31 is pivotally mounted within the U-shaped pivot bracket 46 by means of the pivot pin 47. The pivot bracket 46 is fixedly mounted by any suitable means, as by welding, to the upper end of the adjustable vertical support rod 48 of the upright support 14. The support pivot arm 31 is adapted to be locked in any adjusted position by means of the lock screw 49 which is threaded through the one leg of the bracket 46. The screw 49 is provided with the adjusting lock knob 50 for turning the screw 49 to bring the inner end thereof into friction locking engagement with the pivot arm 31.

As shown in FIGS. 3 and 7, the lower end of the support rod 48 extends downwardly into the vertical tubular upright or sleeve 51. The tubular upright 51 has the lower end thereof fixedly mounted in the vertical recess 53 in the vertical sleeve 52 of the support base member 15. Fixedly mounted, as by welding, in the lower end of the tubular upright 51 is the transverse plate 54. The tubular upright 51 is held in the base sleeve 52 by means of the bolt 55 which passes through the lower end wall 56 of the base sleeve 52 and threads into a hole in the plate 54. The bolt 55 has a hexagonal head 57. As shown in FIG. 7, a circular plate 58 is fixed to the lower end of the support rod 48 and is of an outer diameter substantially the same as the inner diameter of the tubular upright member 51, but of a slightly smaller dimension so as to provide sliding relationship between the plate 58 and the inside surface of the tubular upright 51. A spring 59 is mounted inside the tubular upright 51 and the upper end thereof engages the lower side of the plate 58 and the lower end thereof engages the upper side of the plate 54. The spring 59 provides an upwardly directed bias or force on the vertical support rod 48 to move it upwardly to any desired position relative to the tubular upright 51.

As shown in FIGS. 3 and 7, the support rod 48 is held in any vertical adjusted position within the tubular upright 51 by means of a suitable lock bolt, which is threadably mounted through the hole 60 formed adjacent the upper end of the standard portion 51, and which is provided with the operating knob 61. It will be understood that when the inner end of the lock bolt engages the support rod 48, the rod 48 will be held in a locked position at any desired height relative to the tubular upright 51. The upper end of the tubular upright 51 is enclosed by means of the closure plate 62 which is fixedly secured thereto by any suitable means, as by the screws 63. The support rod 48 passes through a centrally formed hole in the plate 62 which maintains the rod 48 in a central position in the tubular upright 51. As shown in FIG. 7, the support base member 15 further includes the radially disposed horizontal base legs 64 which are provided with suitable non-skid members 65 for engaging a supporting surface as a floor. The base legs 64 are angularly spaced apart approximately 120°.

As shown in FIGS. 1, 2, 13, 17 and 18, the drafting apparatus of the present invention further includes an instrument control knob assembly generally indicated by the numeral 66 which is operatively connected to an instrument straight edge assembly comprising the straight edges 67, 68 and 69. The straight edges 67, 68 and 69 are formed from a tubular, flexible material having a good wearing quality, and the cross sectional shape of these straight edges is substantially elliptical in configuration. The straight edges 67, 68 and 69 may be made from a molded plastic material as nylon tape impregnated with a suitable plastic, or they may be made from steel tape, or they may be made from a suitable plastic reinforced with steel tape.

Figure 13:
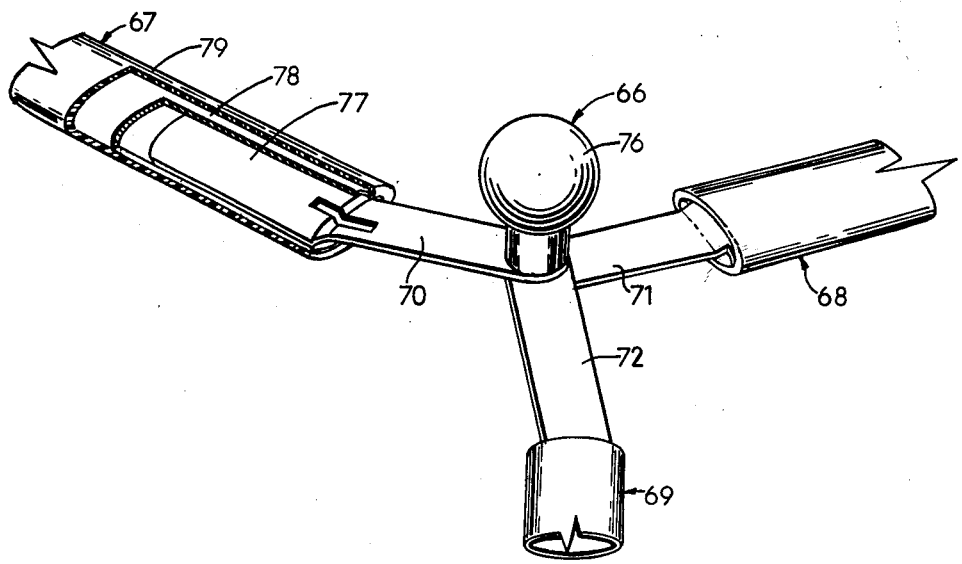
FIG. 13 is a fragmentary enlarged perspective view of the instrument control knob assembly employed in the embodiment of FIG. 1.
Figure 18:
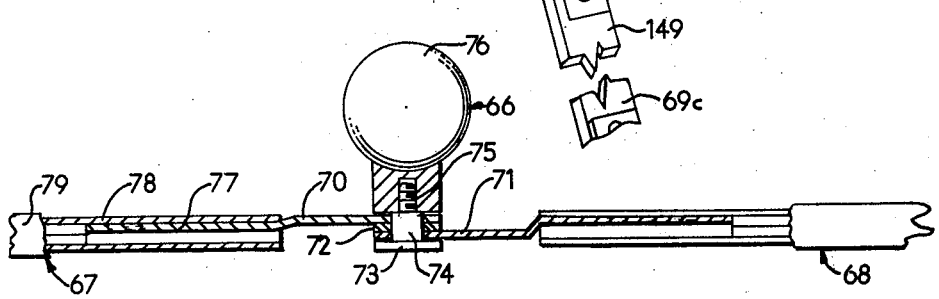
FIG. 18 is a slightly enlarged elevational sectional view of the structure illustrated in FIG. 17, taken along the line 18—18 thereof, and looking in the direction of the arrows.
Figure 17:
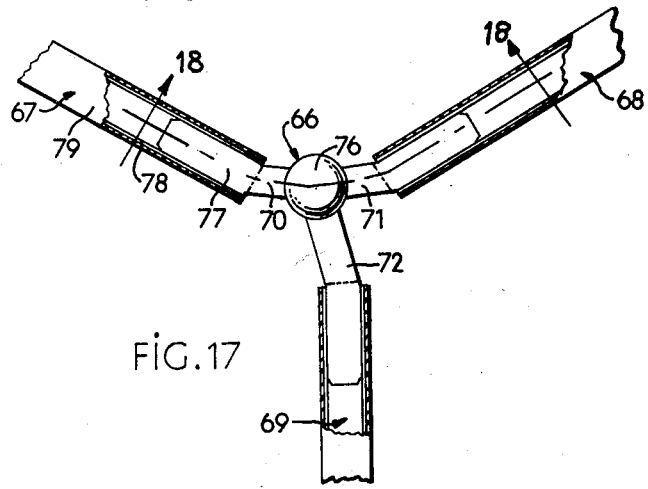
FIG. 17 is a top plan view of the structure illustrated in FIG. 13, and with parts broken away.

The straight edges 67, 68 and 69 are attached to the knob assembly 66 by means of the following described structure. As shown in FIG. 13, the control knob assembly 66 comprises a plurality of connector arms 70, 71 and 72 which are interconnected at the outer ends thereof by means of the structure shown in FIG. 18. As shown in FIG. 18, the control knob assembly 66 comprises a bolt consisting of a base plate 73 on the upper side of which is integrally formed the connector post 74. The outer ends of the connector arms 70, 71 and 72 are provided with suitable holes therethrough through which the connector post 74 is adapted to pass and hold the connector arms in stacked relationship on top of the plate 73, as shown in FIG. 18. Extended upwardly from the upper end of the bolt connector post 74 is the threaded bolt portion 75 on which is threaded the locking knob 76. It will be understood that when the knob 76 is screwed downwardly into engagement with the upper end of the bolt post 74, all of the connector arms will be pivotally secured together on the post 74. The post 74 is longer than the combined thicknesses of the ends of the connector arms to permit the connector arms to pivot on the post 74.

The outer ends of the connector arms 70, 71 and 72 are similarly connected to the straight edges 67, 68 and 69, respectively, and the connection structure for one of these arms will be described and it will be understood that the same connection structure is used for the other arms. As shown in FIG. 13, the outer end 77 of the connector arm 70 is hand pressed into the end of the elliptically shaped straight edge 67 which is shown as formed from the inner steel tape 78 which is covered by the molded plastic 79.

Figure 14:
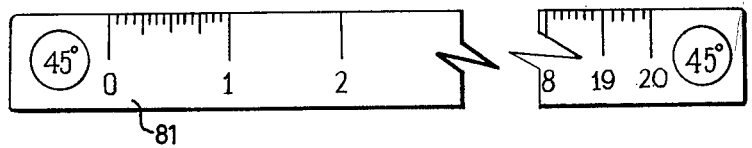
FIG. 14 is a plan view of a diminishing scale adapted for use with the apparatus illustrated in FIG. 1, and showing the central portion of the scale broken away.
Figure 15:
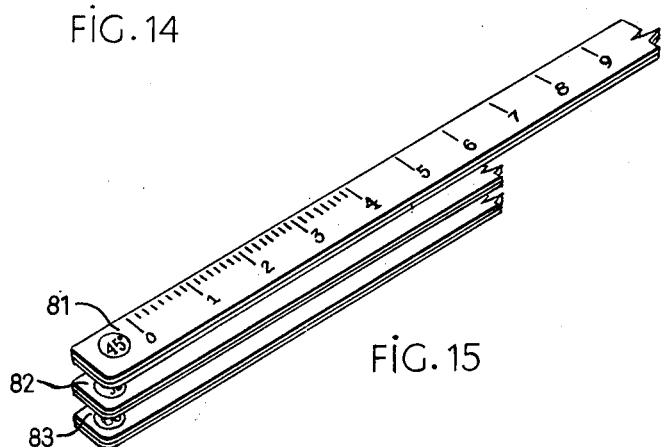
FIG. 15 is a perspective, fragmentary, view of a set of diminishing scales employed with the apparatus illustrated in FIG. 2.

FIGS. 14 and 15 show diminishing scales which are disposed along the base lines of a three plane drawing, as in FIG. 2, for measuring distances along the straight edges 67, 68 and 69. The diminishing scales in FIGS. 14 and 15 are indicated by the numerals 81, 82 and 83, and they are attached to the drawing board 10 by any suitable means, as by a pressure sensitive adhesive on the lower side thereof. It will be understood that the scale 81 is calibrated to read in inches for measuring distances along a diminishing line of 45° from the horizontal, and the scales 82 and 83 are calibrated for the same purpose for diminishing line angles of 50° and 60°, respectively, and so forth.

As shown in FIGS. 1, 4, 8, 9 and 10, the outer ends of the straight edges 67, 68 and 69 are folded 180° back toward the drawing board 10. The outer ends of the straight edges are each operatively supported by means of a structure generally indicated by the numerals 84, 85 and 86, and which may be termed straight edge carriages. The straight edge carriage 84 will be described in detail and the straight edge carriages 85 and 86 will be marked with similar reference numerals followed by the small letters "a" and "b," respectively, to indicate the corresponding structural parts.

As best seen in FIGS. 8, 9 and 10, the straight edge carriage 84 has an H-shaped frame member which includes the two parallel spaced apart legs 87 and 88 which are joined by the integral cross member 89 that extends outwardly from one side thereof. Rotatably mounted on the inner ends of the legs 87 and 88 is a first pair of straight edge guide rollers 90 and 91, respectively, which are formed with grooves therein that mate with the side edges of the elliptically shaped straight edge 67. A second pair of straight edge guide rollers 92 and 93 is rotatably mounted on the outer ends of the legs 87 and 88, respectively, and they also engage the side edges of the straight edge 67.

As shown in FIGS. 8 and 10, the outer end of the straight edge 67 is provided with a connector arm 94 which is hand pressed therein and which is similar to the connector arm 70. The connector arm 94 has the outer end thereof secured to the downwardly depending anchor post 95 by means of the screw 96. The post 95 is connected to the lower side of the cross arm 89 and at a position centrally disposed between the legs 87 and 88. The straight edge carriages are held adjacent the periphery of the drawing board 10, as shown in FIG. 1, by means of the following described support leg structure.

The straight edge carriage 84 is free to pivot around the two carriage support legs 97 and 98 which are carried by the two control rods 99 and 100, respectively, as shown in FIGS. 8 and 9. The control rod 99 is provided on the outer end thereof with a bifurcated or U-shaped connector member 101 which is pivotally mounted on the tubular post 102 which is in turn secured to the lower end of the support leg 97 by means of the bolt 103. The outer end of the control rod 99 is threadably mounted into the U-shaped connector member 101 for adjustment purposes. The control rod 100 is also connected to the leg 98 in the same manner by means of the U-shaped connector member 104.

As shown in FIG. 4, the control rods 99 and 100 extend radially inwardly behind the drawing board 10 and each of these rods is provided with an adjustably mounted magnetic roller 105 and 106, respectively. As shown in FIGS. 11 and 12, the magnetic roller 106 is mounted on the non-magnetic sleeve 107 by means of a press fit. The sleeve 107 rotates freely on the control rod 99 and is retained against longitudinal movement by means of the collars 108 and 109 which are secured in place by any suitable means, as by means of the lock screws 110 and 111. It will be understood that the magnetic roller 105 is operatively secured on the control rod 100 in a similar manner.

As shown in FIG. 4, the inner ends of the carriage control rods 99 and 100 are swingably connected to opposite ends of the diminishing and directional control assembly arm 112. As shown in FIGS. 20 and 22, the inner end of the control rod 99 is operatively connected to the diminishing and directional control assembly arm 112 by means of the following described structure. The inner end of the control rod 99 is provided with an enlarged head 113, which is rotatably mounted in the outer bifurcated end of the universal connector member 114. The control rod head 113 is pivotly secured to the universal connector member 114 by means of the pivot screw 115. The inner end of the universal connector member 114 is provided with a bifurcated construction which is disposed perpendicularly to the bifurcated portion on the other end thereof and in which is pivotly received the outer end of the inner connector rod member 116.

The inner connector rod member 116 is rotatably connected to the connector member 114 by means of the pivot pin 117. The numeral 118 indicates a counter balance spring which relieves the excessive weight from the control rod assembly. It will be seen that the inner end of rod 99 and the outer end of rod 116 function as parts of the universal connection structure.

The inner connector rod member 116 is integrally formed with the gear rack member 120 which is slidably mounted on the under side of the diminishing and directional control assembly arm 112, as shown in FIGS. 20 and 22. The rod 119 is press fitted into a suitable recess in the lower end of the diminishing lock knob 121, which is provided with an indicator 122 along the lower side thereof. The rod 119 is threaded at the lower end thereof and extends downwardly through the longitudinally disposed slot 123 formed in the lever 112, and threadably engages a suitable hole in the universal connector member 116, as shown in FIG. 22. It will be seen that when the gear rack member 120 is moved longitudinally of the lever 112, that the universal connector member 116 may be locked in place in an adjusted position on the lever 112 by appropriate turning of the diminishing lock knob 121 which will thread the screw 119 inwardly into the connector member 116 and bring the lower end of the knob 121 into locking engagement with the upper surface of the lever 112. The rod 116 and gear rack member 120 can each be separately formed and welded together.

It will be understood that the control rod 100 is also connected by means of a similar universal connection structure to a second gear rack 124 which is also slidably mounted on the under side of the lever 112 but along one side thereof which is opposite to the side on which the gear rack 120 is disposed.

As shown in FIG. 20, a U-shaped body member 125 is fixedly secured beneath the lever 112 at the central position thereof by means of a plurality of suitable metal screws as the screws indicated by the numeral 126. A transverse slot 127 is formed in the body 125 and slidably mounted therethrough are the gear racks 120 and 124. A gear or pinion 128 is operatively mounted within the body 125 and meshably engages with the racks 120 and 124. The gear or pinion 128 is press fitted onto the vertical shaft 129 which extends downwardly through the body 125 and carries the pulley 130. As shown in FIGS. 4, 5 and 6, a belt or cable 131 is operatively mounted around the pulley 130, and also around the pulley 132 which is fixed on the shaft 133. The shaft 133 extends through the plate 20 and has fixedly mounted on the front end thereof the diminishing control knob 134. The diminishing control knob 134 is suitably rotatably nested in the arcuate recess 135 formed on the outer periphery of the drawing board.

As shown in FIGS. 19 and 21, the lever 112 is provided with a centrally disposed hole therethrough as the hole 136 through which is mounted the threaded sleeve 137. The lower end of the sleeve 137 is tapered outwardly as clearly shown in FIG. 21 and this tapered portion mates with a mating tapered portion in the hole 136 along the lower end thereof. It will be seen that the lever 112 is adapted to freely rotate or pivot on the lower end of the threaded sleeve 137. The sleeve 137 extends upwardly into the tubular member 43. Fixedly secured to the lower end of the tubular member 43 by any suitable means is a circular disc 138 which may be formed integral with the sleeve 43 as being die-cast therewith. Operatively mounted on the lower end of the disc or pad 138 is a layer of friction (138a) material which is adapted to abut the upper face of the lever 112 for gripping the same and holding it in an adjusted position. The threaded sleeve 137 is keyed to the circular pad 138 by means of the key 139 which permits longitudinal movement therebetween but which prevents rotary movement relative to each other. When the sleeve 137 is provided with an upwardly directed movement, the lever 112 is moved upwardly into locking engagement with the lower surface of the friction material 138a for gripping the same in an adjusted position. The friction material 138a is preferably fixed to the disc 138.

The threaded sleeve 137 is locked in place by means of the directional lock knob 140 which is provided with the bushing 141 that is press fitted into the knob 140 and is threaded on the inner diameter thereof for threadable engagement over the upper end of the threaded sleeve 137. The bearing washer 142 is mounted on the upper end of the tubular member 43 and the directional lock knob 140 bears against the upper end of the washer 142.

In the use of the present invention, the operator would mount a piece of drawing paper as 143 on the front surface 11 of the drawing board 10, as shown in FIG. 2. The desired starting point 144 is located on the paper 143 and a straight edge 67 is then held on the point 144 and the carriage 84 is manually rotated to the desired angular direction. The carriage 84 is then locked into place by means of the directional lock knob 140. The same steps are followed for positioning the straight edges 68 and 69.

The desired point 145 is then established and the straight edge 67 is held on the point 145. Starting with the diminishing lock knob 121 in the unlocked position, the control rods 99 and 100 are then moved inwardly and outwardly along the lever 112, by diminishing control knob 134, until they are in the desired diminishing effect position at which times the diminishing lock knobs 121 are tightened to lock the control rods 99 and 100 to the lever 112. The same procedure is followed for the straight edges 68 and 69. The diminishing scales 81, 82 and 83 are then positioned along the drawing base lines of the picture as shown in FIG. 2. The operator is then ready to proceed to make a drawing as indicated by the numeral 146.

Figure 16:
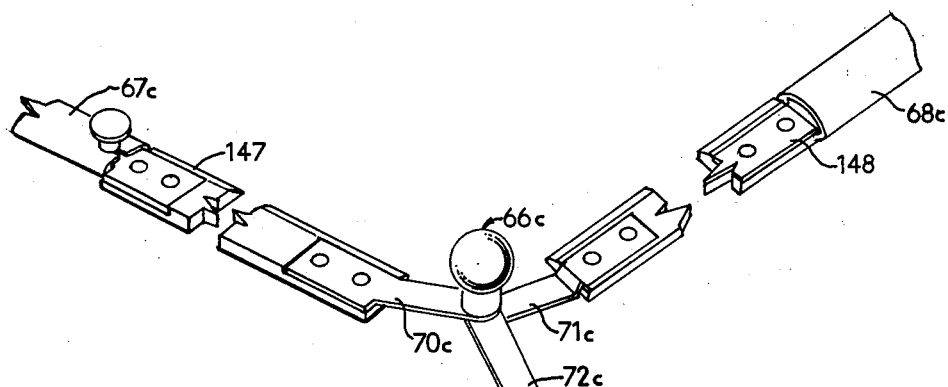
FIG. 16 is a view similar to FIG. 13 and showing a modified instrument control knob assembly adapted for use with the apparatus of FIG. 1.

FIG. 16 is similar to FIG. 13 and shows a modified straight edge control knob assembly generally indicated by the numeral 66c. The control knob assembly 66c is the same as the control knob assembly 66 with the exception that a portion of the straight edges 67c, 68c and 69c have been made with a solid form and a ruler-like edge for drawing purposes, and these portions are indicated by the numerals 147, 148 and 149.

FIGS. 24 and 25 show a slightly modified straight edge carriage structure in which the corresponding structure has been marked with similar numerals as shown in the structure of FIG. 8 and followed by the small letter "d." The difference between the straight edge carriage embodiment of FIGS. 24 and 25, and that of FIG. 8, is that the control rod connector structure is slightly modified. As shown in FIG. 24, the control rod 99d has the outer end thereof hand pressed into the horizontal leg of a tubular L-shaped connector member generally indicated by the numeral 147. A vertical leg of the connector member has the post 148 hand pressed therein. The post 148 is slidably mounted through the hole 149 in the carriage leg 87d and is secured in place by the lock nut 150 which is threadably mounted on the upper threaded end 151 of the post 148. The other control rod 100d would be similarly secured to the carriage 84d by means of the L-shaped tubular connector member 152. It will be understood that the nut 150 maintains the post 148 from dropping out of the arm 87d but it will permit rotation of the post 148 in the arm 87d. The straight edge carriage structure of FIGS. 24 and 25 may be used with the embodiment of FIG. 4 as well as with the embodiment of FIG. 23.

FIGS. 23 and 26 through 31 illustrate a second embodiment of the invention in which the diminishing control knobs 134 and the corresponding connecting structure for adjusting the diminishing effect from the front of the board are not used. In this embodiment, the diminishing effect is produced by manually controlling the control rods from the rear side of the drawing board. The parts of this embodiment which are similar to the parts of the embodiment of FIG. 4 are marked with similar reference numerals followed by the small letter "e."

Figure 23:
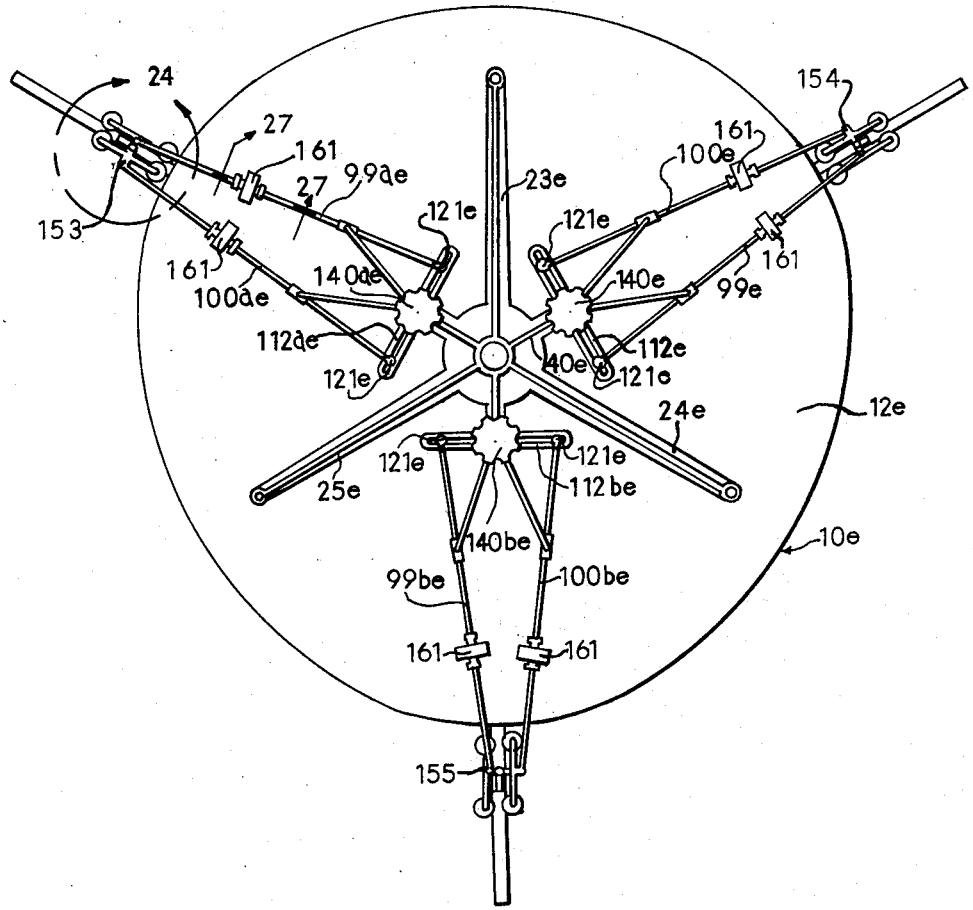
FIG. 23 is an elevational rear view of a modified diminishing and directional control assembly employed in the invention.

The straight edge carriage assemblies used in the structure of FIG. 23 are generally indicated by the numerals 153, 154 and 155, and the structure of these straight edge carriages is of the type shown in FIG. 24. FIG. 26 illustrates a slightly modified control rod structure which is employed in the embodiment of FIG. 23. The control rod of FIG. 26 is made from a single member and has an outer L-shaped end 156. The rod portion 156 extends through the hole 157 in the carriage legs as 87e, and is rotatably secured in place therein by means of a suitable lock nut 158. The control rod portion 156 extends through the spacer collar 159 which is disposed below the carriage leg 87e. The collar 159 may be fixedly secured to the rod portion 156 by any suitable means, as by means of the lock screw 160.

Rollably mounted on each of the control rods of FIG. 23, as shown in detail in FIG. 27, is a rubber roller 161 which is adjustably held in place on the control rods, as rod 99e, by means of the lock collars 162 and 163 which are fixedly secured in place by any suitable means, as by means of the lock screws 164 and 165. The rubber rollers 161 are adapted to roll on the rear surface 12e of the drawing board 10e. All of the rubber rollers employed in the structure of FIG. 23 are marked with the same numeral 161 in FIG. 23.

Figures 28, 29, 30, 31:
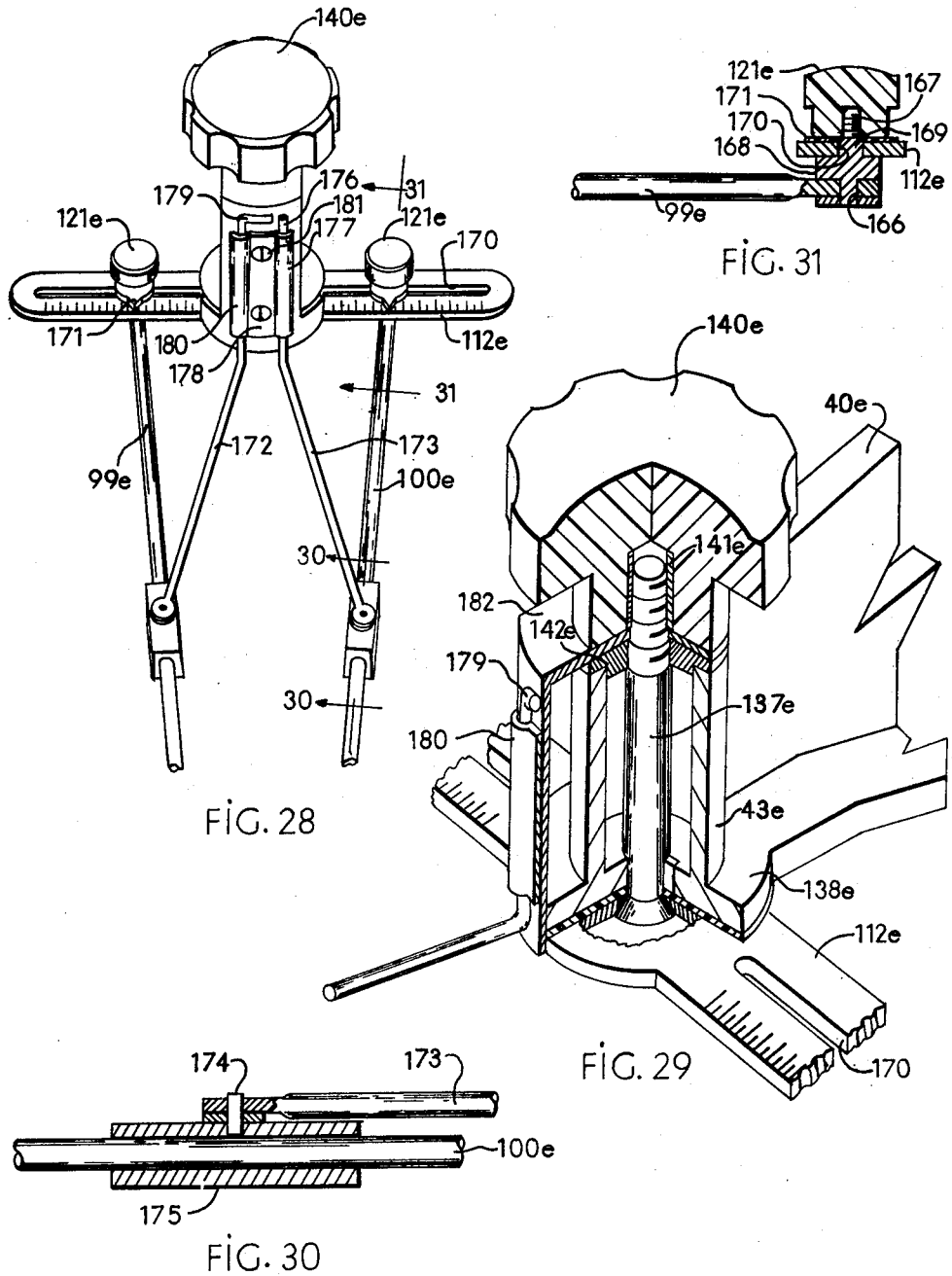
FIG. 28 is a perspective view of the modified diminishing control lock knob structure employed in the structure of FIG. 23.
FIG. 29 is an enlarged, partly in section, perspective view of the diminishing control lock knob shown in FIG. 28.
FIG. 30 is a fragmentary, enlarged, elevational sectional view of the structure illustrated in FIG. 28, taken along the line 30—30 thereof and looking in the direction of the arrows; and, FIG. 31 is an enlarged, fragmentary, elevational sectional view of the structure illustrated in FIG. 28, taken along the line 31—31 thereof and looking in the direction of the arrows.

As shown in FIGS. 23 and 31, the inner end of the control rods 99e and 100e are connected directly to the manually operated lock knobs 121e. All of the manually operated lock knobs shown in FIG. 23 are marked with the same reference numeral 121e. As shown in FIG. 31, the inner end of the control rod is provided with a hole therethrough as indicated by the numeral 166 through which is slidably mounted the screw 167. The mounting screw 167 extends upwardly through the slider member 168 which has a square part 169 extended upwardly and adapted to slide in the slot 170 in the directional control arm 112e. The screw 167 extends above the control arm 112e and is threadably mounted in the lower side of the diminishing control lock knob 121e. An indicating member 171 is carried on the screw 167 below the lock knob 121e, to assist in locating the diminishing control rods in the desired position. It will be seen that the control rods in the embodiment of FIG. 23 are manually moved to the desired position along the control arm 112e and then they are each locked in place by means of the lock knobs 121e. The control rods of FIG. 23 are thus separately adjustable instead of being simultaneously adjustable by the control knobs 134 of the embodiment of FIG. 4.

As shown in FIGS. 23, and 29 through 30, the control arms 99e and 100e are provided with the stabilizer rods 172 and 173, respectively, and these last mentioned rods act as a counter-balance and function to hold the rollers 161 on these rods against the rear surface 12e of the drawing board 10e. As best seen in FIG. 30, the outer end of the rod 173 is hingedly connected by means of the pin 174 to the slider block or sleeve 175 which is slidably mounted on the control rod 100e. As shown in FIGS. 28 and 29, the rod 173 is connected at the outer end thereof by means of the right angled rod portion 176 which is rotatably mounted in the sleeve member 177 which is formed on one side of the plate 178. The other rod 172 is provided with a similar right angled outer end portion 179 that is rotatably mounted in the integral sleeve 180 formed on the outer side of the plate 178. The plate 178 is fixedly secured by any suitable means, as by means of the screws 181, to the outwardly extended U-shaped bracket 182 which is fixedly secured to the shaft 137e of the directional control post structure 43e. The direction and the diminishing control structure of the embodiment of FIG. 23 functions in the same manner as the aforedescribed embodiment of FIG. 4 with the exception that the control rods 99e and 100e are separately, manually moved along the control rod arm 112e instead of being gear actuated by means of the control knobs 134.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. In a drafting instrument for producing three-plane drawings, the combination of:
    (a) an elliptical drawing board having a front side and a rear side,
    (b) a support frame mounted on the rear surface of said board,
    (c) three straight edges operatively mounted on the front side of the drawing and being disposed in a position with their inner ends directed to a common meeting point,
    (d) a control knob assembly hingedly connecting the inner ends of said straight edges and adapted for moving the straight edges over the front side of the drawing board for drawing operations,
    (e) a movable carriage means mounted on the periphery of the drawing board at the outer end of each of said straight edges and having fixedly connected thereto the adjacent straight edge outer end,
    (f) a pair of control rods disposed on the rear side of the drawing board adjacent each of the movable carriage means and having the outer ends thereof hingedly connected to the adjacent carriage means,
    (g) a directional control means for each of said pairs of control rods mounted on said board and being operatively connected to the inner ends of each pair of control rods,
    (h) a diminishing control means for each of said pairs of control rods and being adapted to operatively connect the inner ends of each pair of control rods to the directional control means for each pair of control rods, and
    (i) supporting means for said control rods.

2. In a drafting instrument for producing three-plane drawings, the combination of:
    (a) an elliptical drawing board having a front side and a rear side,
    (b) a support frame mounted on the rear surface of said board,
    (c) three straight edges operatively mounted on the front side of the drawing and being disposed in a position with their inner ends directed to a common meeting point,
    (d) a control knob assembly hingedly connecting the inner ends of said straight edges and adapted for moving the straight edges over the front side of the drawing board for drawing operations,
    (e) a movable carriage means mounted on the periphery of the drawing board at the outer end of each of said straight edges and having fixedly connected thereto the adjacent straight edge outer end,
    (f) a pair of control rods disposed on the rear side of the drawing board adjacent each of the movable carriage means and having the outer ends thereof hingedly connected to the adjacent carriage means,
    (g) a directional control means for each of said pairs of control rods mounted on said board and being operatively connected to the inner ends of each pair of control rods,
    (h) said directional control means including an adjustable arm pivotally connected to said support frame and means for locking said arm in an adjusted position,
    (i) a diminishing control means for each of said pairs of control rods and being adapted to connect the inner ends of each pair of control rods to the respective directional control arm, and
    (j) supporting means for said control rods.

3. In a drafting instrument for producing three-plane drawings, the combination of:
    (a) an elliptical drawing board having a front side and a rear side, (b) a support frame mounted on the rear surface of said board,
(c) three straight edges operatively mounted on the front side of the drawing and being disposed in a position with their inner ends directed to a common meeting point,
(d) a control knob assembly hingedly connecting the the inner ends of said straight edges and adapted for moving the straight edges over the front side of the drawing board for drawing operations,
(e) a movable carriage means mounted on the periphery of the drawing board at the outer end of each of said straight edges and having fixedly connected thereto the adjacent straight edge outer end,
(f) a pair of control rods disposed on the rear side of the drawing board adjacent each of the movable carriage means and having the outer ends thereof hingedly connected to the adjacent carriage means,
(g) a directional control means for each of said pairs of control rods mounted on said board and being operatively connected to the inner ends of each pair of control rods,
(h) a diminishing control means for each of said pairs of control rods and being adapted to operatively connect the inner ends of each pair of control rods to the directional control means for each pair of control rods,
(i) supporting means for said control rods, and
(j) each of said straight edges being formed from a flexible tubular material and being elliptical in cross section.

4. In a drafting instrument for producing three-plane drawings, the combination of:
(a) an elliptical drawing board having a front side and a rear side,
(b) a support frame mounted on the rear surface of said board,
(c) three straight edges operatively mounted on the front side of the drawing and being disposed in a position with their inner ends directed to a common meeting point,
(d) a control knob assembly hingedly connecting the inner ends of said straight edges and adapted for moving the straight edges over the front side of the drawing board for drawing operations,
(e) a movable carriage means mounted on the periphery of the drawing board at the outer end of each of said straight edges and having fixedly connected thereto the adjacent straight edge outer end,
(f) a pair of control rods disposed on the rear side of the drawing board adjacent each of the movable carriage means and having the outer ends thereof hingedly connected to the adjacent carriage means,
(g) a directional control means for each of said pairs of control rods mounted on said board and being operatively connected to the inner ends of each pair of control rods,
(h) a diminishing control means for each of said pairs of control rods and being adapted to operatively connect the inner ends of each pair of control rods to the directional control means for each pair of control rods.
(i) supporting means for said control rods, and,
(j) said control knob assembly including three connector arms having their outer ends detachably connected to the inner ends of the individual straight edges, a control knob, and the inner ends of said connector arms being pivotally connected on a common axis by said control knob.

5. The structure defined in claim 4 wherein: said control knob assembly connector arms are each provided with a ruling edge along one side thereof.

6. In a drafting instrument for producing three-plane drawings, the combination of:
(a) an elliptical drawing board having a front side and a rear side,
(b) a support frame mounted on the rear surface of said board,
(c) three straight edges operatively mounted on the front side of the drawing and being disposed in a position with their inner ends directed to a common meeting point,
(d) a control knob assembly hingedly connecting the inner ends of said straight edges and adapted for moving the straight edges over the front side of the drawing board for drawing operations,
(e) a movable carriage means mounted on the periphery of the drawing board at the outer end of each of said straight edges and having fixedly connected thereto the adjacent straight edge outer end.
(f) a pair of control rods disposed on the rear side of the drawing board adjacent each of the movable carriage means and having the outer ends thereof hingedly connected to the adjacent carriage means,
(g) a directional control means for each of said pairs of control rods mounted on said board and being operatively connected to the inner ends of each pair of control rods,
(h) a diminishing control means for each of said pairs of control rods and being adapted to operatively connect the inner ends of each pair of control rods to the directional control means for each pair of control rods.
(i) supporting means for said control rods, and
(j) each of said carriage means including a frame, the outer ends of the adjacent straight edge passing over the frame and being folded thereover and attached thereto, and roller guide means on said frame for guiding the straight edge passing over the frame.

7. The structure defined in claim 6 wherein: said control knob assembly includes three connector arms having their outer ends detachably connected to the inner ends of the individual straight edges, a control knob, and the inner ends of said connector arms are pivotally connected on a common axis by said control knob.

8. The structure defined in claim 7 wherein: each of said straight edges are formed from a flexible tubular material and are elliptical in cross section.

9. The structure defined in claim 8 wherein: said directional control means includes an adjustable arm pivotally connected to said support frame, and a means for locking said arm in an adjustable position.

10. The structure defined in claim 9 wherein: said supporting means for said control rods includes a magnetic roller mounted on each of the control rods, and a magnetic roller metal plate mounted on the rear side of the board under each set of control rods for operative engagement by the magnetic rollers.

11. The structure defined in claim 9 wherein: said supporting means for said control rods includes a rubber roller mounted on each control rod and adapted to rollably engage the rear side of the board and a stabilizer rod interconnected between the inner end of each of the control rods and the support frame.

12. The structure defined in claim 9 wherein: said diminishing control means includes a lock knob adjustably mounted on each end of the directional control arms and connected to the inner ends of the control rods for adjustably securing the inner ends of the control rods in adjusted positions along the directional control arms.

13. The structure defined in claim 9 wherein: said diminishing control means includes lock knob means for securing the inner ends of the control rods in adjusted positions on the ends of the directional control arms, gear means for moving the lock knobs inwardly and outwardly along the directional control arms, and roller adjustment means mounted on the periphery of the board and interconnected with said gear means for operating the gear means.

14. In a drafting instrument for producing three-plane drawings, the combination of:

(a) an elliptical drawing board having a front side and a rear side,
(b) a support frame mounted on the rear surface of said board,
(c) three straight edges operatively mounted on the front side of the drawing and being disposed in a position with their inner ends directed to a common meeting point,
(d) a control knob assembly hingedly connecting the inner ends of said straight edges and adapted for moving the straight edges over the front side of the drawing board for drawing operations,
(e) a movable carriage means mounted on the periphery of the drawing board at the outer end of each of said straight edges and having fixedly connected thereto the adjacent straight edge outer end,
(f) a pair of control rods disposed on the rear side of the drawing board adjacent each of the movable carriage means and having the outer ends thereof hingedly connected to the adjacent carriage means,
(g) a directional control means for each of said pairs of control rods mounted on said board and being operatively connected to the inner ends of each pair of control rods, and,
(h) supporting means for said control rods.

References Cited in the file of this patent
UNITED STATES PATENTS
2,665,486 Barker et al. _____ Jan. 12, 1954